No. 712,996. Patented Nov. 4, 1902.
G. M. CLARK.
HARROW.
(Application filed Apr. 8, 1901.)
(No Model.) 2 Sheets—Sheet 1.

Attest:

Inventor:
George Marshall Clark,
By Howell Battle
Attorney.

No. 712,996. Patented Nov. 4, 1902.
G. M. CLARK.
HARROW.
(Application filed Apr. 8, 1901.)
(No Model.) 2 Sheets—Sheet 2.
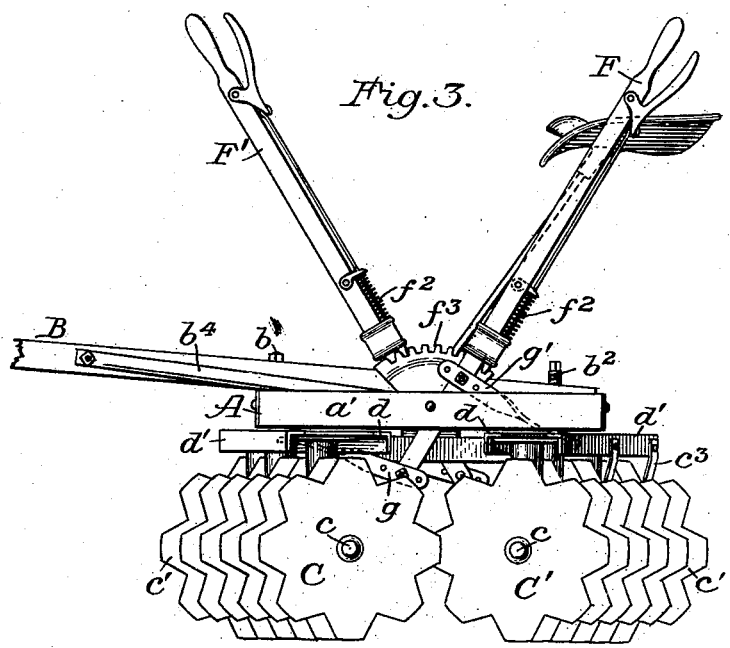
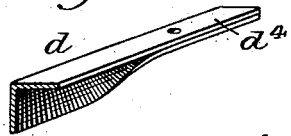
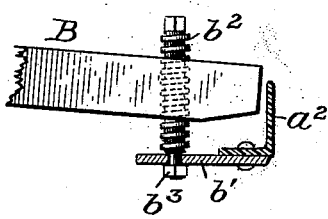
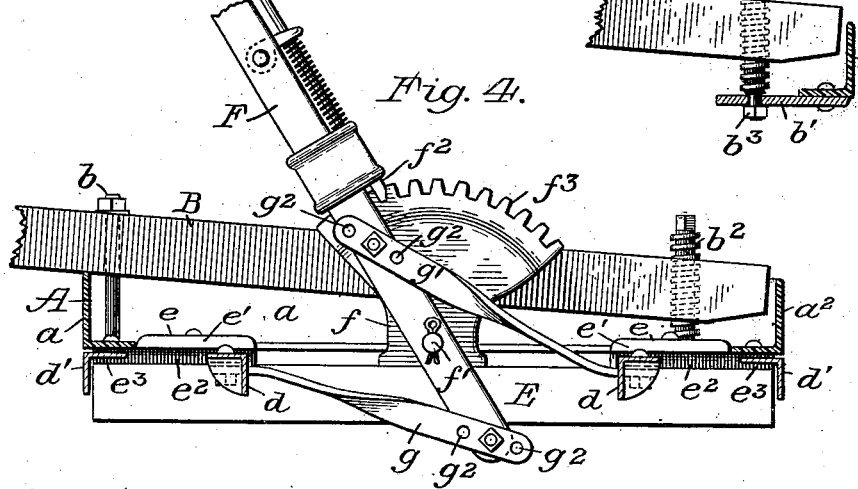
Inventor:
George Marshall Clark,
By Howell Bartte
Attorney

UNITED STATES PATENT OFFICE.

GEORGE MARSHALL CLARK, OF HIGGANUM, CONNECTICUT, ASSIGNOR, BY MESNE ASSIGNMENTS, TO CLEMENTINE I. CLARK, OF HIGGANUM, CONNECTICUT.

HARROW.

SPECIFICATION forming part of Letters Patent No. 712,996, dated November 4, 1902.

Application filed April 8, 1901. Serial No. 54,844. (No model.)

*To all whom it may concern:*

Be it known that I, GEORGE MARSHALL CLARK, a citizen of the United States, residing at Higganum, in the county of Middlesex and State of Connecticut, have invented new and useful Improvements in Harrows, of which the following is a specification.

My invention relates to improvements in rotary harrows, and particularly to such as have two sets or gangs of rotary cutters arranged one in front of the other for cutting and throwing earth in opposite directions. Harrows of this type are designed to obviate the necessity of reworking the earth for the purpose of restoring the ground to its original level condition and also to more thoroughly pulverize and aerate the soil than is possible with a harrow having a single line or gang of cutters.

The main object of my invention is the production of a thoroughly efficient machine for the purposes intended, which shall be simple and practical and, as far as possible, free from objectionable features that have rendered prior machines of the same character of little or no practical value.

To these ends my invention consists in a novel combination and organization of parts to be hereinafter described, and particularly pointed out in the claims hereto annexed.

Figure 1:
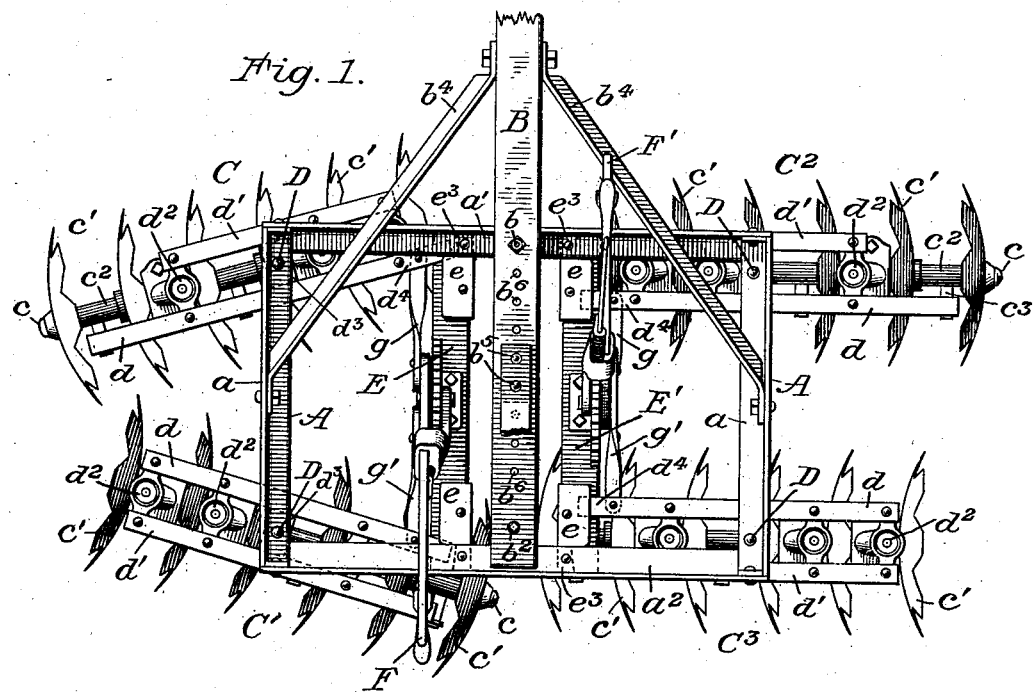
Figure 2:
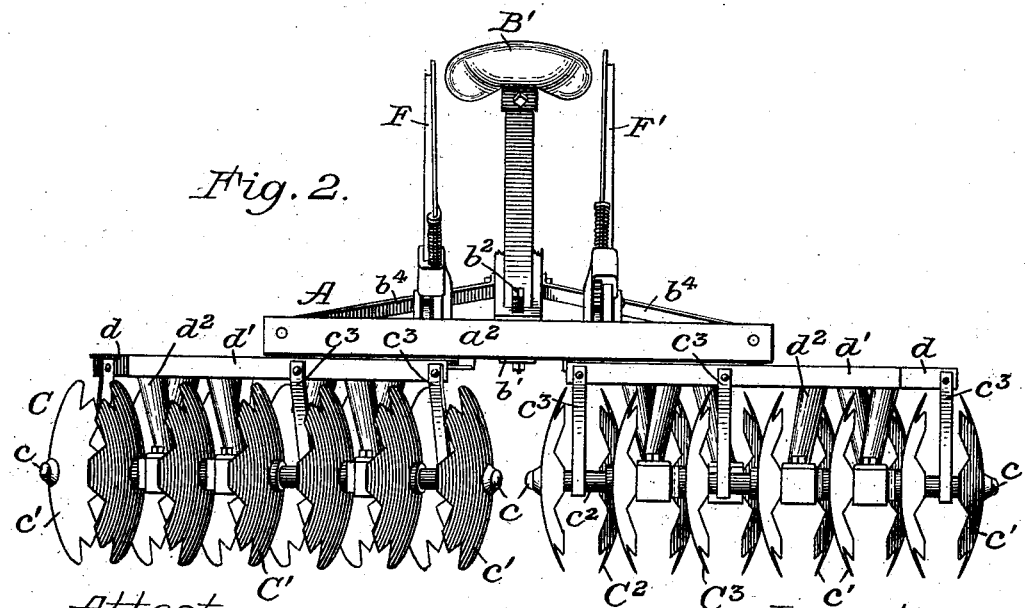

Referring to the drawings, Figure 1 is a top or plan view of a harrow embodying my invention. Figs. 2 and 3 illustrate the same in rear and side views, respectively. Fig. 4 is a detail of one of the gang-adjusting levers and its connections. Fig. 5 is a detail of the inner end of one of the angle-irons of the gang-frames, and Fig. 6 is a detail illustrating the adjustable connection between the inner end of the pole and the main frame.

The main frame A of my machine may be of any suitable shape or construction; but, as shown, it is composed of four angle-irons bolted or riveted together to form a rectangular structure, the two angle-irons $a\ a$ forming the sides and the angle-irons $a'$ and $a^2$ the front and rear, respectively.

The draft-pole B is centrally and rigidly secured to the main frame, but in such a manner that the rear end of the pole may be readily raised or lowered for correspondingly lowering or raising its outer end for adjusting it to the height of the team to be employed. The pole and the front angle-iron $a'$ of the frame are secured together by a bolt $b$, which passes through the pole and the lower flange of the angle-iron, with the rear end of the pole extending to and overlying a plate $b'$, secured to the under side of the rear angle-iron $a^2$, as shown in Fig. 6. Tapped into or through the rear end of the pole B is a screw $b^2$, the lower end of which passes through the plate $b'$, to which it is secured by means of a nut $b^3$, so that by turning the screw the pole may be raised or lowered as required, as will be readily understood. The pole is firmly held by side braces $b^4$, secured thereto and to the side angle-irons $a$ of the frame, as best shown in Fig. 1.

The driver's seat B' is mounted on the pole B by bolts $b^5$, and additional bolt-holes $b^6$ are bored through the pole, so that the seat may be moved forward or backward for shifting the weight of the driver and properly balancing the machine.

The gangs of cutters, four in number, lettered C, C', C², and C³, are arranged in pairs at each side of the line of draft, with the gangs of each pair placed one in front of the other with their cutting-disks turned in opposite directions, so that the rear gang will operate to throw the earth in a direction opposite to the action of the forward gang. Each gang is pivotally secured to the main frame to swing in a horizontal plane at a point within the path cut by the disks and, preferably, about midway of its two ends, so that the width of the harrow will not be materially varied by the adjustments of the gangs, this being of importance when it becomes necessary to weight the harrow, as it obviates the necessity of shifting the weights at each variation in the angular adjustment of the gangs. It is to be noted in this connection that the character and structure of the main frame is such that weights may be readily applied and adjusted when required. The gangs are each made up of a gang-shaft $c$, upon which are fixedly mounted the cutting-disks $c'$, the latter being spaced upon the shaft by means of interposed spools or spacing-thimbles $c^2$ in the usual manner. Each gang is mounted in a separate gang-frame composed of two angle-irons $d\ d'$, bolted to opposite sides of hangers $d^2$, in which the gangs are journaled. To the angle-irons $d'$ are secured the usual clod-breakers $c^3$, and about midway between the ends of the gangs is a cross-piece $d^3$, riveted to the angle-irons $d$ and $d'$ and bored to receive the pivotal bolt D, by means of which the gang-frame is secured to the main frame A. The location of the pivotal bolts D on the main frame is immaterial, and while they are shown as passing through the side angle-irons $a\ a$ they may be located in the front and rear angle-irons $a'$ and $a^2$, and the main frame may be made of a width sufficient to admit of shifting the location of the bolts for extending the gangs outwardly to reach under the limbs of trees; but the structure of the entire harrow is such that a special frame may be furnished at small cost for use in orchard-work, and the harrow as a whole may be otherwise varied, as by increasing or decreasing the number of cutting-disks, by simply cutting the structural iron into the required lengths.

The inner ends $d^4$ of the angle-irons $d$ of the gang-frames are flattened, as shown in Fig. 5, and said ends overlie cross-ties E and E', which are secured to the under side of the front and rear angle-irons of the main frame at each side of the draft-pole. On top of each cross-tie are two cast-metal cleats $e$, having a projecting edge $e'$, which forms a slot $e^2$ between said edge and the upper side of the cross-tie, into which the ends $d^4$ of the angle-irons $d$ project for maintaining the gangs and gang-frames in a practically horizontal plane and guiding said frames while the gangs are being adjusted to the required angle. The cleats $e$ are also provided with an extension $e^3$, which is interposed between the cross-ties and the main frame to afford a space between the two as a continuation of the slots $e^2$, as clearly shown in Fig. 4.

All of the gangs are secured to the main frame in the same manner and operate precisely in the same way, but in reverse directions. The two front gangs C and C² when both are in working adjustment operate to throw the earth toward the center of the harrow, and the two rear gangs C' and C³ operate to throw the earth from the center outwardly. The gangs C² and C³ are shown in a right-line position and the gangs C and C' in an angular or working position. The adjustment from one position to the other or to any intermediate position is effected by the hand-levers F and F', which separately control the movements of each pair of gangs, the pair at the left being controlled by the lever F and the pair at the right by the lever F'. These levers are mounted on standards $f$, bolted to the cross-ties E and E', and extend below their pivotal points, (see Fig. 4,) where they are connected by links $g$ to the inner end of the angle-iron $d$ of the front gang-frames.

The angle-irons $d$ of the rear gang-frames are similarly connected to said levers by links $g'$, which are pivoted thereto above the pivotal point $f'$, so that the inner ends of each pair of gangs will be simultaneously moved toward or from each other by a forward or backward movement of their appropriate lever. Both levers F and F' are provided with a common form of trip-latch, which coöperates with a segmental rack $f^3$ for holding the gangs to their positions of adjustment, as will be readily understood. The links $g$ and $g'$ are provided with extra bolt-holes $g^2$ for lengthening or shortening the connections between the gang-frames and the adjusting-levers, and thereby varying the relative adjustment of the gangs. If one of the links be shortened and the other lengthened, the harrow may be operated with the rear gangs in a right line and the forward gangs in an angular position, the latter operating to cut and throw the earth toward the center of the machine to be pulverized by the rear gangs. By shifting the levers the relative positions of the gangs will be reversed, so that the forward gangs will do the pulverizing and the rear gangs the cutting, the latter throwing the earth from the center outwardly or back to its original level condition. It will thus be seen that however the machine may be adjusted it will not be necessary to operate it in what is termed "half-lap," as must be done with the ordinary harrow having but a single line of cutting-disks, which must be operated so that each line of operation will overlap the preceding line to throw the earth back to its original level.

My harrow may be readily converted into a harrow of the ordinary type by simply removing the front or rear gangs, in which case the driver's seat must be moved forward or backward to balance the machine, and this must also be done when the harrow is to be operated with the front or rear gangs in a right-line adjustment.

Having thus described my invention, what I claim as new, and desire to secure by Letters Patent, is—

1. In a harrow, the combination of a main frame, two gangs of rotary cutters at each side of the central line of draft arranged one in front of the other, each gang being secured to said frame by a fixed pivotal connection at a point between its outer ends, and means for simultaneously swinging the gangs of each pair on their pivotal points in opposite directions independently of the other pair of gangs and holding them to their positions of adjustment, substantially as described.

2. In a harrow, the combination of a main frame, four gangs of rotary cutters pivoted at fixed points to said frame in pairs at opposite sides of the line of draft, the gangs of each pair being arranged one in front of the other and to throw earth in opposite directions, and means for simultaneously moving the gangs of each pair on their pivotal points in opposite directions independently of the other pair, substantially as described.

3. In a harrow, the combination of a main frame, four gang-frames each carrying a gang of rotary cutters, said gang-frames being arranged in pairs at opposite sides of the central line of draft and secured to the main frame by a fixed pivotal connection, and means for simultaneously moving the gangs of each pair on their pivotal points in opposite directions independently of the other pair and holding them to their positions of adjustment, substantially as described.

4. In a harrow, the combination of a pole, a main frame rigidly secured thereto, four gangs of rotary cutters pivoted at fixed points to the main frame in pairs at opposite sides of said pole, and means for simultaneously swinging the gangs of each pair in opposite directions independently of the other pair and holding them to their positions of adjustment, substantially as described.

5. In a harrow, the combination of a main frame, four gangs of rotary cutters arranged in pairs at opposite sides of the central line of draft and pivoted thereto at points inside of the tracks cut by said gangs, the gangs of each pair being arranged one in front of the other, and means for simultaneously moving the gangs of each pair on their pivotal points independently of the gangs of the other pair and holding them to their positions of adjustment, substantially as described.

6. In a harrow, the combination of a main frame, four gangs of rotary cutters arranged in pairs at opposite sides of the central line of draft with the gangs of each pair arranged one in front of the other, each gang being secured to said main frame by a pivotal connection located between the ends of the gang, means for simultaneously swinging the gangs of each pair in opposite directions independently of the gangs of the other pair and holding them in their positions of adjustment, and guides on the main frame for maintaining the gangs in a practically horizontal plane while being adjusted, substantially as described.

7. In a harrow, the combination of a main frame, four gangs of rotary cutters pivotally secured thereto and arranged in pairs at each side of the central line of draft with the gangs of each pair arranged one in front of the other, a lever for each pair of gangs pivotally mounted on the main frame and connected to its appropriate pair of gangs by link connections which are secured to said lever one above and the other below its pivotal point, substantially as described.

8. In a harrow, the combination of a pole, a main frame rigidly secured thereto, four gang-frames pivotally secured to said main frame and arranged in pairs at opposite sides of said pole with the gang-frames of each pair arranged one in front of the other, a gang of rotary cutters journaled in each gang-frame, hand-levers for each pair of gang-frames pivotally mounted on the main frame, a link connecting each gang-frame with its appropriate lever, said links being attached to said levers one above and the other below their pivotal points, substantially as described.

9. In a harrow, the combination of a main frame, four gangs of rotary cutters pivotally secured thereto and arranged in pairs at each side of the central line of draft with the gangs of each pair arranged one in front of the other, a lever for each pair of gangs pivotally mounted on the main frame and connected to its appropriate pair of gangs by links which are secured to said levers one above and the other below their pivotal points, and means for adjusting said link connections, substantially as described.

In testimony whereof I have hereunto set my hand in presence of two subscribing witnesses.

GEORGE MARSHALL CLARK.

Witnesses:
 N. B. STONE,
 CLEMENT S. HUBBARD.